July 25, 1933.  F. D. FOWLER  1,919,363
APPARATUS FOR EMBOSSING PLASTIC ARTICLES
Filed March 12, 1932
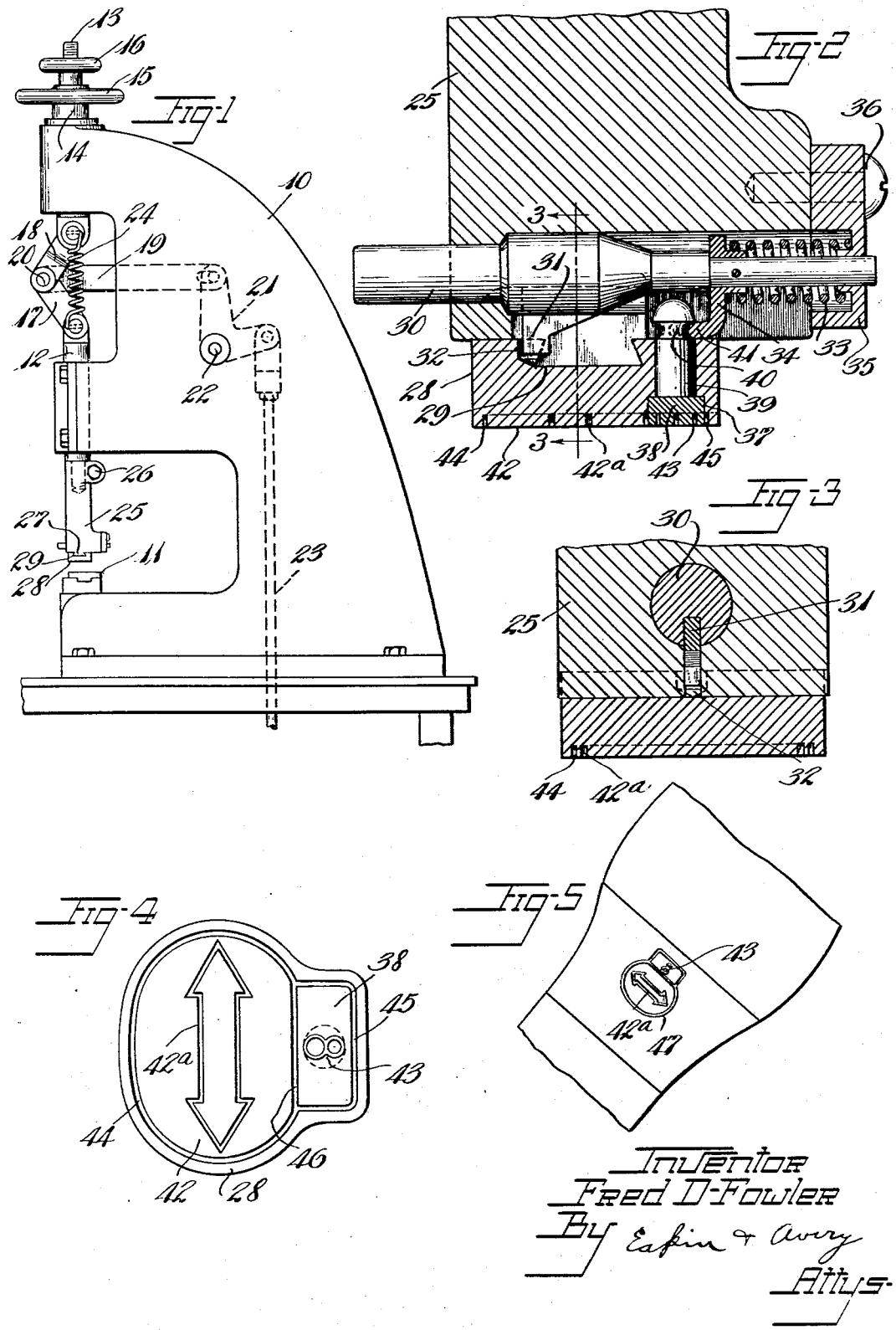
Inventor
Fred D. Fowler
By Eakin & Avery
Attys.

Patented July 25, 1933

1,919,363

UNITED STATES PATENT OFFICE

FRED D. FOWLER, OF NEWTON, MASSACHUSETTS, ASSIGNOR TO THE B. F. GOODRICH COMPANY, OF NEW YORK, N. Y., A CORPORATION OF NEW YORK

APPARATUS FOR EMBOSSING PLASTIC ARTICLES

Application filed March 12, 1932. Serial No. 598,523.

This invention relates to apparatus for embossing plastic articles such as unvulcanized soles for shoes.

The principal objects of the invention are to promote neatness, efficiency and uniformity, and to provide for replacement of the dies without the use of tools.

Other objects will appear from the following description and the accompanying drawing.

In the drawing:

Fig. 1 is a side elevation of an embossing press.

Fig. 2 is an enlarged cross-sectional view of the embossing die.

Fig. 3 is a cross-sectional view on line 3—3 of Fig. 2.

Fig. 4 is a view of the face of the embossing die.

Fig. 5 is a view of a portion of a shoe sole showing embossing applied thereto.

Referring to the drawing, the numeral 10 designates the frame of an embossing press which supports an anvil 11 and is provided with a guideway in line therewith in which a ram 12 is slidably fitted. An adjusting screw 13 is threaded through a sleeve 14 journaled in the frame 10 in line with the ram 12 and having a hand wheel flange 15 by which it may be turned to elevate or lower the screw 13. A lock-wheel 16 also threaded on rod 13 acts as a locking device to hold the screw 13 in adjusted position.

A pair of toggle links 17 and 18 are pivoted respectively to the ram 12 and the screw 13 and are pivoted to each other and to a third link 19 at 20. A bell crank lever 21 is pivoted at 22 to frame 10 and has its vertical arm pivotally engaging link 19 and its horizontal arm engaging arm operating rod 23 which extends to a pedal lever (not shown). Through this mechanism depressing of the pedal straightens the toggle and lowers the ram 12 to embossing position. A coil spring 24 holds the ram 12 normally in raised position.

An embossing-die holder 25 is clamped at 26 to ram 12. It is formed on its lower face with a dove-tailed rib 27 extending thereacross. An embossing die 28 is grooved as at 29 to slidably engage this rib. A locking pin 30 slidably mounted on the holder 25 is provided with a key 31 which slidably engages a slot 32 traversing the dove-tailed rib 27. A compression spring 33 is normally held in compression about the pin 30 between a collar 34 mounted on said pin and a cap 35 fastened to the holder 25 as by a screw 36, the arrangement being such that the spring 33 normally holds the pin 30 in the position shown in Fig. 2, where the key 31 engages a notch in the die 28 and locks it to the holder 25. Pressure applied to the left end of pin 30 will disengage the key 31 and allow the die to be removed by sliding it along the dovetailed rib 27.

The embossing die 28 is mortised as at 37 to accommodate an auxiliary embossing die 38 and the auxiliary die is provided with a stem 39 which passes through an opening at the bottom of the recess mortise and is peripherally grooved at 40 and rounded therebeyond. A projection 41 on collar 34 engages the groove 40 where the pin 30 is in the position shown and holds the auxiliary die in place. On the pin 30 being moved to the right in Fig. 2, the stem 39 is released and the auxiliary die 38 may be removed.

The embossing die 28 is adapted to be forced by the toggle mechanism into a plastic article lying on the anvil 11 to emboss a trade mark 42a or other marking and the auxiliary die 38 may be used to emboss a size designation 43 simultaneously therewith. For such purposes a plurality of interchangeable auxiliary members 38 may be provided and may be quickly and easily changed without the use of tools by simply depressing the pin 30. When the pin 30 is depressed the die 28 may also be removed if desired.

I have found that when two female embossing dies are mounted on one die holder in widely spaced relation and simultaneously forced into a plastic stock an objectionable bulge or ridge is formed between the two impressions, the wide space permitting an excessive upward flow or bulging of the stock, and that it is desirable also to avoid too wide a land between the indicia recesses of the two dies, such as would call for an excessive displacement of stock along the face of the sheet. By mounting the auxiliary die within the area of the embossing die and forming a groove therebetween of such width and depth as to permit only such upward flow and set of rubber as occurs in the indicia recesses an embossed design is provided of which all elements are of the same height and which consequently has the appearance of having been formed by a single, unitary die. Also, by having the groove at the meeting faces of the two dies, formation of a fin at the position is avoided.

In contemplation of these facts the embossing die 28 is formed with a flat surface 42 in which the emblem or trade mark 42a is engraved, the engraving comprising a groove which preferably is of uniform width, so that resistance to the rising of the stock therein will be uniform, and of sufficient depth to permit the stock to rise high enough to take permanent set in a sufficiently raised condition. Near its margin the surface 42 is formed with a groove 44, similar in cross-section, to provide displacement space for the rubber in addition to the space provided by the emblem 42a. The auxiliary die 38 has a flat face flush with the face 42 and with the die 28 defines a displacement groove 45 adapted to constitute a continuation of the groove 44 when the dies are assembled. It also has a displacement groove 46, in communication with the groove, provided at the meeting line of the dies. The engraved size number in the auxiliary die 38 is likewise engraved so as to correspond in groove width and depth with the other grooves in the device. The various grooves 44, 45 and 46, dividing the lands into units of moderate size, prevent undesirable excessive outward flow of the rubber compound and thereby prevent to a substantial degree the forming of a raised ridge around the design impressed in the article, at the same time providing an ornamental border 47 around the emblem and size designation on the article as seen in Fig. 5. The resistance to flow of material within the grooves of equal width being equal, the material will flow no higher in the groove defining the meeting line of the two dies than in the other parts of the design, and the other advantages indicated above are obtained.

I claim:

1. Apparatus for embossing a plastic article, said apparatus comprising a plane-faced backing, and, adapted to co-act therewith, an embossing-die holder, a female embossing die mounted thereon, and formed with a mortise therein, and an auxiliary female embossing die seated in said mortise, the design of the two dies being so closely associated that they constitute virtually a single design.

2. Apparatus for embossing a plastic article, said apparatus comprising an embossing-die holder, an embossing die mounted thereon and formed with a mortise therein, an auxiliary embossing die mounted in said mortise, and locking means carried by said punch holder for simultaneously locking said auxiliary die in said mortise and locking said embossing die in said holder.

3. Apparatus for embossing a plastic article, said apparatus comprising an embossing-die holder, an embossing die mounted thereon, means on said holder for slidably engaging said die, an auxiliary die, and means carried by the aforesaid means for locking said auxiliary die to said embossing die.

4. Apparatus for embossing a plastic article comprising an embossing die having indicia grooves formed in its face and formed with a mortise for receiving an auxiliary die, an auxiliary die seated in said mortise and having indicia grooves formed therein, the first said die and the auxiliary die being formed to provide an embossing groove along their meeting line.

5. Apparatus as defined in claim 4 in which the two dies are formed to provide a continuous groove around the periphery of the embossing area.

6. Apparatus for embossing a plastic article comprising an embossing die having indicia grooves formed in its face and formed with a mortise for receiving an auxiliary die, an auxiliary die seated in said mortise and having indicia grooves formed therein, the first said die and the auxiliary die being formed to provide a continuous groove surrounding the embossing area, all of the grooves being of substantially equal width, and all major lands of the assembly being of approximately equal width.

7. Apparatus as defined in claim 6 in which the two dies are formed to provide an embossing groove along their meeting line.

FRED D. FOWLER.